Patented Apr. 10, 1945

2,373,527

UNITED STATES PATENT OFFICE 2,373,527

SYNTHETIC RESINOUS COMPOSITIONS

Maynard C. Agens, Schenectady, N. Y., assignor to General Electric Company, a corporation of New York No Drawing. Application December 13, 1941, Serial No. 422,905

15 Claims. (Cl. 260—75)

This invention relates to synthetic resinous or resin-forming compositions derived from partial esters of alpha-unsaturated polycarboxylic acids and to a process of preparing them. It is concerned particularly with the preparation of resinous reaction products of the above type capable of polymerizing to an insoluble, infusible state.

An object of the present invention is to produce novel resinous materials which can be used in the preparation of coating, impregnating, and molding compositions and which comprise alcohol-polybasic acid esterification products capable of being more readily hardened by oxidation or polymerization due to the presence of terminal double bonded groups $$(CH_2\!=\!\overset{|}{C}\!-\text{ groups})$$

in the esterified product.

Another object of the invention is to provide a novel method for introducing vinyl groups into the condensation reaction products of alcohols and alpha-unsaturated polybasic acids.

Other objects of my invention will become apparent from the following description of my invention.

The present invention is based on my discovery that when certain alpha-unsaturated acids such as maleic acid, or the mono-esterification reaction products of alcohols and these alpha-unsaturated polybasic acids are treated with cyclic amines selected from the group consisting of pyridine and its homologues and hydrocarbon derivatives, i. e., quinoline, nicotine, piperidine, etc., large quantities of carbon dioxide are given off with the resultant formation of decarboxylated resinous masses which are much more readily hardened by polymerization or oxidation and hence are faster air-drying than are the ordinary alpha-unsaturated polybasic acid esterification products.

Any of the mono- or poly-hydric alcohols used in resin manufacture may be employed in the practice of my invention including the saturated monohydric alcohols such as methyl, ethyl, propyl, butyl, etc., alcohols, the dihydric alcohols such as ethylene glycol, propylene glycol, butylene glycol, diethylene glycol, etc., the trihydric alcohols such as glycerine, etc., or mixtures of two or more of these alcohols.

I prefer to use the mono- or di-hydric alcohols or alcoholic mixtures comprising major proportions of these alcohols, as the resin-forming reactions involving such alcohols are more easily controlled. However, provided adequate precautions are taken to control the rate of reaction and to carry the initial mono-esterification reaction to substantial completion before the introduction of the decarboxylating agent, the higher polyhydric alcohols such as glycerine, pentaerythritol and the like may be used alone.

As the polybasic acid reactant I prefer maleic or fumaric acids since the free carboxyl groups in the mono-esters of both of these acids are readily decarboxylated to form terminal $$CH_2\!=\!CH\!-$$

groups. Other alpha-unsaturated acids which may be used and which are decarboxylated when treated with the above amines are itaconic acid and aconitic acid. However, the number of terminal $$CH_2\!=\!\overset{|}{C}\!-$$

groups obtained by the decarboxylation of these latter acids is correspondingly smaller and is dependent upon the extent to which the carboxyl groups have entered into the esterification reaction.

The following examples will serve to illustrate in greater detail typical resinous compositions falling within the scope of my invention.

EXAMPLE 1

To compare the products obtained by reacting glycol with maleic anhydride with and without the addition of pyridine, the following resins were prepared.

(A) Straight diethylene glycol-maleate resins.

Resin No. 1

| Composition | Cooking schedule | Saponification value | Acid value | Color |
|---|---|---|---|---|
| 1470 g. maleic anhydride. 1590 g. diethylene glycol. | (1 hr. to 200° C., and 6 hrs. 200–210° C.) | 593 | 26 | Yellow. |

Resin No. 2

| Composition | Cooking schedule | Saponification value | Acid value | Color |
|---|---|---|---|---|
| 980 g. maleic anhydride. 1060 g. diethylene glycol. | (2 hrs. at 170° C., 1 hr. 170–200° C., and 4 hrs. 200–220° C.) | 593.5 | 49 | Yellow. |

(B) Pyridine-modified diethylene glycol-maleate resins.

Resin No. 3

| Composition | Cooking schedule | Saponification value | Acid value | Color |
|---|---|---|---|---|
| 294 g. maleic anhydride. 318 g. diethylene glycol. 15 c. c. pyridine. | (¾ hr. 120–130° C., 5½ hrs. 140–150° C., 3 hrs. 160–200° C.) | 457 | 22.2 | Red. |

Resin No. 4

| Composition | Cooking schedule | Saponification value | Acid value | Color |
|---|---|---|---|---|
| 980 g. maleic anhydride. 1060 g. diethylene glycol. 15 c. c. pyridine. | (¾ hr. 165° C., 1 hr. 170–190° C., and 1 hr. 205° C.) | 506 | 25.8 | Red. |

In Resins 3 and 4 the pyridine was added to a mixture of the remaining ingredients at the beginning of the reaction. The cooking schedules for the pyridine-modified resins were necessarily shorter and at lower temperatures because of the faster rate of reaction of these modified resins.

It can be seen from the above that the saponification value of the straight diethylene glycol maleate resin does not change with the change in size of the batch nor the heating schedule. However, when a decarboxylating agent such as pyridine is used there is a considerable change in saponification value, depending upon the ratio of pyridine to size of batch and upon the heating schedule which controls the rate of loss of $CO_2$ as well as the loss of water.

Tests conducted to determine the air-drying and baking characteristics of these two types of resins indicated that the introduction of the more reactive terminal double bonds by use of a decarboxylating agent makes the resin much more reactive with oxygen. Although the introduction of the $CH_2=CH-$ groups does not change the total unsaturation of the resin, it does change the type of unsaturation in that these double bonds are terminal and hence more reactive. Solutions of the diethylene glycol maleate resins made with and without pyridine were prepared and to each was added 4 per cent by weight of a metallic drier, specifically cobalt acid maleate, based on the weight of the resin. In four hours a film of the resin made with pyridine had dried to touch and had a smooth, unwrinkled surface, while a film of the resin made without pyridine was still quite sticky. For the baking tests 1 per cent by weight of benzoyl peroxide based on the weight of resin was added to the resin solutions. At 100° C. a film of the resin made with pyridine dried in 20 minutes while a film of the resin made without pyridine was still sticky. At 150° C. the same relation existed, and only 8 minutes was required to set the pyridine resin. When no peroxide was added the resin made without the use of pyridine seemed to bake faster at 100° C. This observation can be explained by the fact that a balanced formula was used in the preparation of these resins and hence decarboxylation must necessarily leave unreacted hydroxyl groups. This condition, if found objectionable, may be remedied by taking an excess of the acid or by acetylating or benzoylating the final resin.

Preferably, as is shown in the following examples, the decarboxylating agent is added to the alcohol-polybasic acid reaction mass after the esterification reaction has proceeded to a point where the mass has an acid value of about one-half that of the original unreacted mixture; that is where about one-half of the carboxyl groups of the polybasic acid component are unreacted.

EXAMPLE 2

A mixture of 980 parts by weight maleic anhydride and 1060 parts by weight of diethylene glycol was introduced into a closed reaction vessel provided with an inlet for introducing an inert gaseous atmosphere such as nitrogen into the vessel and a side arm condenser for condensing any water given off during the reaction. The condenser was in turn connected to a water trap for collecting the condensate, a drier for removing the last traces of water vapor from the effluent gas, and a soda lime tube for absorbing carbon dioxide. The alcohol-acid mixture was heat reacted in the inert atmosphere to an acid value of 233. Ten parts pyridine were then added to this esterified product. The reaction was continued in an inert atmosphere for 20 minutes up to a temperature of 150° C., 5 hours at 150–160° C. and 1¾ hours at 180–196° C. to produce a reddish, viscous resin syrup having an acid value of 30. A large amount of carbon dioxide was given off during the reaction, as was evidenced by an increase of 120 gms. in the weight of the soda lime tube.

EXAMPLE 3

A mixture of 294 parts maleic anhydride and 318 parts diethylene glycol was heated for about 20 minutes at 155° C. in an apparatus such as that used in Example 2. The 20 minute reaction period was sufficient to carry the initial esterification or anhydride reaction substantially to completion with the formation of a mixture containing a large proportion of the monoglycol ester of maleic acid. One part pyridine was added and the reaction continued for ¾ hour at 175–200° C. and 1¾ hours at 200–210° C. The product was a reddish, resinous syrup with an acid value of 34.3. The increase in weight of the soda lime tube indicated that 27 gms. $CO_2$ were given off during the reaction.

As each of the above formulations call for a balance, at the beginning of the reaction, of hydroxyl and carboxyl groups, the final decarboxylated product must contain an excess of hydroxyl groups. To avoid this result, the resins may be prepared using an excess of carboxyl groups, i. e., polycarboxylic acid, as is shown in the following example.

EXAMPLE 4

A mixture of 294 parts maleic anhydride and 265 parts diethylene glycol were reacted together under the conditions set forth in Example 2 to an acid value of 312. Five parts pyridine were added and the reaction continued for one hour at 190–197° C. The syrupy product had an acid value of 57.2. About 46 grams of $CO_2$ were given off.

In any of the above formulations, all or part of maleic anhydride may be replaced by maleic acid or any of the alpha-unsaturated polycarboxylic acids mentioned hereinbefore. These alpha-unsaturated acids may be replaced in part by any of the acids used in the preparation of alkyd resins including such acids as succinic, phthalic, crotonic, benzoic and the like. These acids however are not decarboxylated when heated with pyridine or the other decarboxylated agents used in the practice of my invention and therefore impart to the final resinous products those characteristics possessed by ordinary alkyd resins prepared from these acids.

In the above examples, the decarboxylating agent, specifically pyridine, was used in amounts ranging from 0.3-5 per cent by weight based on the weight of the alpha-unsaturated acid, specifically maleic anhydride; that is, from 0.004 to 0.06 mol pyridine per mol of maleic anhydride. The rate of decarboxylation will depend on the concentration of the decarboxylating agent in the reaction mixture. Preferably from 0.01 to 0.1 mol of the decarboxylating agent per mol of acid is used. The decarboxylating agent apparently removes only one of the carboxyl groups in the polybasic acid even though neither has undergone esterification with the alcohol. This is indicated by the fact that when equimolecular proportions of maleic acid and pyridine are heated together about 1 mol of $CO_2$ is given off and the residue left in the reaction vessel consists of a thick resinous mass of polymerized pyridine acrylate and a heavy liquid layer of monomeric pyridine acrylate.

EXAMPLE 5

An identification of the intermediate and final products formed during the preparation of butyl acrylate from butyl alcohol and maleic anhydride was made possible because of the less complex reactions involved and shows the types of reactions taking place in the manufacture of resins in accordance with my invention. The alcohol and anhydride were heated together in equimolecular proportions until an acid value of 325 was reached. The theoretical value for the monobutyl ester of maleic acid is 326. When this reaction mass cooled, maleic acid crystallized out indicating that although the mixture had the correct acid value for the monoester, the diesters and some free acid were also present. The cloudy liquid which remained after the separation of the crystalline maleic acid and which contained the mono- and di-esters and had an acid value of 300 was heated with a decarboxylating agent, specifically pyridine. About 15 parts by weight of $CO_2$ were liberated from each 100 parts of the ester mixture during the heating step. The distillate collected from the reaction was washed with dilute hydrochloric acid and water to remove the pyridine and then taken up in either. After evaporation of the ether, a light yellow liquid remained. This liquid was found to contain a large proportion of butyl acrylate.

It is to be understood that the free acids need not be separated from the ester mixtures before the decarboxylating agent is added. As the free acids are readily decarboxylated to the corresponding monobasic acids, the decarboxylated products will co- or inter-polymerize with the remaining polymerizable materials. This is true whether a mono-, di-, or poly-hydric alcohol is used in the preparation of the mono-ester.

The resinous masses of this invention when in the soluble, fusible form, may be employed as such or in solution in the preparation of paints, lacquers, baking enamels, impregnating compositions, insulating compositions, laminated products, etc. Suitable solvents for the resins include acetone, diacetone, chlorinated benzene, ethyl acetate, benzene- or toluene-alcohol mixtures, etc. In any of these applications the resins may be modified by the addition of other materials including other resins, e. g., alkyd resins, aminoplast resins, vinyl or acrylic resins, polyvinyl acetals, or the like; cellulose derivatives, e. g., cellulose esters and ethers; plasticizers, e. g., triphenyl phosphate, tricresyl phosphate, castor oil, glycerine, and the like; or with fillers, e. g., wood flour, paper, glass fiber, sand, asbestos, and the like. The decarboxylated esters may be co- or inter-polymerized with other polymerizable substances such as the vinyl compounds, i. e., vinyl chloride, vinyl acetate, etc., the acrylic and methacrylic acid esters, or the diallyl esters of phthalic acid or succinic acid and the like.

When the resins are used in compositions intended for air-drying applications, suitable metallic driers such as are used in air-drying varnishes may be incorporated into the compositions to accelerate hardening thereof. Likewise polymerization catalysts may be used to accelerate the conversion of these resins into the insoluble, infusible form. Benzoyl peroxide, hydrogen peroxide, acetyl peroxide, acetyl benzoyl peroxide, lauroyl peroxide, lauryl peroxide, stearyl peroxide, peroxides of tetrahydro-furane, ascaridol, and calcium peroxide are examples of catalysts of this type.

What I claim as new and desire to secure by Letters Patent of the United States is:

1. A resinous composition comprising a polymerizable, decarboxylated, partially esterified alpha-unsaturated polycarboxylic acid obtained by heat-reacting an alpha-unsaturated polycarboxylic acid with an alcohol in the presence of from about 0.004 to 0.1 mol, per mol of alpha-unsaturated polycarboxylic acid, of a cyclic amine capable of decarboxylating partial esters of said alpha-unsaturated acid, the said cyclic amine being selected from the group consisting of pyridine, quinoline, nicotine, and piperidine and their homologues.

2. A resinous composition comprising the insoluble, polymerized product of claim 1.

3. A resinous composition comprising a decarboxylated esterification product obtained by heating an ester of an alcohol and an alpha-unsaturated polycarboxylic acid in which about one-half of the carboxyl groups of the unsaturated acid are esterified with the alcohol with a cyclic amine selected from the group consisting of pyridine, quinoline, nicotine, and piperidine and their homologues to effect decarboxylation of the unesterified carboxyl groups of said ester, the said amine being present in the mol ratio of from 0.004 to 0.1 mol per amine per mol of alpha-unsaturated polycarboxylic acid.

4. The insoluble, infusible, oxygen-converted product of claim 3.

5. A resinous composition comprising the product of decarboxylating an esterification product of approximately equimolecular proportions of an alcohol and an alpha-unsaturated polycarboxylic acid containing about one free carboxyl group per molecule of polycarboxylic acid by heating said esterification product with a cyclic amine selected from the group consisting of pyridine, quinoline, nicotine, and piperidine and their homologues in the mol ratio of from 0.004 to 0.1 mol cyclic amine per mol of alpha-unsaturated acid.

6. A resinous composition comprising a decarboxylated glycol mono-ester of an alpha-unsaturated polycarboxylic acid obtained by decarboxylating a glycol mono-ester of an alpha-unsaturated polycarboxylic acid by heating said ester in the presence of from 0.01 to 0.1 mol of a decarboxylating agent selected from the group consisting of pyridine, quinoline, nicotine, and piperidine and their homologues per mol alpha-unsaturated polycarboxylic acid.

7. A resinous composition comprising a decarboxylated glycol mono-maleate obtained by decarboxylating glycol mono-maleate by heating said mono-maleate in the presence of from 0.01 to 0.1 mol of a cyclic amine selected from the group consisting of pyridine, quinoline, nicotine, and piperidine and their homologues per mol of mono-maleate.

8. A resinous composition capable of being converted to an insoluble, infusible state comprising the reaction product obtained by heating a decarboxylating agent selected from the group consisting of pyridine, quinoline, nicotine, and piperidine and their homologues with the reaction product obtained by heat-reacting an alcohol and an alpha-unsaturated polycarboxylic acid to an early stage of esterification where about one-half of the carboxyl groups have been esterified to cause decarboxylation of the unesterified carboxyl groups of said alpha-unsaturated polycarboxylic acid, the said decarboxylating agent being present in that amount corresponding to from 0.01 to 0.1 mol per mol of alpha-unsaturated polycarboxylic acid.

9. A polymerizable resinous composition comprising the reaction product obtained by heating from about 0.01 to 0.1 mol of an amine selected from the group consisting of pyridine, quinoline, nicotine, and piperidine and their homologues with one mol of a glycol mono-ester of an alpha-unsaturated polycarboxylic acid to effect a decarboxylation of unesterified carboxyl groups in said mono-ester.

10. A polymerizable resinous composition comprising the product of heat reaction of from about 0.01 to 0.1 mol of a cyclic amine selected from the group consisting of pyridine, quinoline, nicotine, and piperidine and their homologues with one mol of a mono-ester of glycol and maleic acid to effect a decarboxylation of unesterified carboxyl groups in said mono-ester.

11. The method which comprises heat-reacting an alcohol with an alpha-unsaturated polycarboxylic acid until the initial mono-esterification reaction has taken place and decarboxylating the esterified product by heating said esterification product with from 0.01 to 0.1 mol, per mol of polycarboxylic acid, of a cyclic amine selected from the group consisting of pyridine, quinoline, nicotine, and piperidine and their homologues.

12. The method which comprises heat-reacting glycol with maleic anhydride in an inert atmosphere until the acid value of the condensation product is about one-half that calculated for the original unreacted mixture, adding from 0.004 to 0.06 mol pyridine per mol maleic anhydride to said condensation product and heating the resultant mixture to effect a decarboxylation of unesterified carboxyl groups present in said condensation product with the resultant formation of a soluble, fusible, polymerizable resin.

13. A polymerizable resinous product obtained by heating a mixture of ingredients comprising a mono-ester of an alcohol and an alpha-unsaturated polycarboxylic acid and from 0.004 to 0.06 mol per mol polycarboxylic acid of an amine selected from the group consisting of pyridine, quinoline, nicotine, piperidine, and their homologues to effect decarboxylation of the free carboxyl groups of said mono-ester.

14. A resinous product obtained by decarboxylating free carboxyl groups in a mono-ester of diethylene glycol and an alpha-unsaturated polycarboxylic acid by heating said mono-ester with from 0.3 to 5 per cent by weight of pyridine based on the weight of the polycarboxylic acid.

15. A resinous product obtained by decarboxylating free carboxyl groups in a di-ethylene glycol mono-ester of maleic acid by heating said mono-ester with from 0.004 to 0.06 mol pyridine per mol maleic acid.

MAYNARD C. AGENS.

---

CERTIFICATE OF CORRECTION.

Patent No. 2,373,527. April 10, 1945.

MAYNARD C. AGENS.

It is hereby certified that error appears in the printed specification of the above numbered patent requiring correction as follows: Page 2, second column, line 74, Example 4, after "benzoic" insert --acids--; page 3, first column, line 55, Example 5, for "either" read --ether--; and second column, line 58, claim 3, strike out "per" first occurrence; page 4, second column, line 32, claim 13, after "effect" insert --a--; and that the said Letters Patent should be read with this correction therein that the same may conform to the record of the case in the Patent Office.

Signed and sealed this 19th day of June, A. D. 1945.

Leslie Frazer (Seal) Acting Commissioner of Patents.

saturated polycarboxylic acid obtained by decarboxylating a glycol mono-ester of an alpha-unsaturated polycarboxylic acid by heating said ester in the presence of from 0.01 to 0.1 mol of a decarboxylating agent selected from the group consisting of pyridine, quinoline, nicotine, and piperidine and their homologues per mol alpha-unsaturated polycarboxylic acid.

7. A resinous composition comprising a decarboxylated glycol mono-maleate obtained by decarboxylating glycol mono-maleate by heating said mono-maleate in the presence of from 0.01 to 0.1 mol of a cyclic amine selected from the group consisting of pyridine, quinoline, nicotine, and piperidine and their homologues per mol of mono-maleate.

8. A resinous composition capable of being converted to an insoluble, infusible state comprising the reaction product obtained by heating a decarboxylating agent selected from the group consisting of pyridine, quinoline, nicotine, and piperidine and their homologues with the reaction product obtained by heat-reacting an alcohol and an alpha-unsaturated polycarboxylic acid to an early stage of esterification where about one-half of the carboxyl groups have been esterified to cause decarboxylation of the unesterified carboxyl groups of said alpha-unsaturated polycarboxylic acid, the said decarboxylating agent being present in that amount corresponding to from 0.01 to 0.1 mol per mol of alpha-unsaturated polycarboxylic acid.

9. A polymerizable resinous composition comprising the reaction product obtained by heating from about 0.01 to 0.1 mol of an amine selected from the group consisting of pyridine, quinoline, nicotine, and piperidine and their homologues with one mol of a glycol mono-ester of an alpha-unsaturated polycarboxylic acid to effect a decarboxylation of unesterified carboxyl groups in said mono-ester.

10. A polymerizable resinous composition comprising the product of heat reaction of from about 0.01 to 0.1 mol of a cyclic amine selected from the group consisting of pyridine, quinoline, nicotine, and piperidine and their homologues with one mol of a mono-ester of glycol and maleic acid to effect a decarboxylation of unesterified carboxyl groups in said mono-ester.

11. The method which comprises heat-reacting an alcohol with an alpha-unsaturated polycarboxylic acid until the initial mono-esterification reaction has taken place and decarboxylating the esterified product by heating said esterification product with from 0.01 to 0.1 mol, per mol of polycarboxylic acid, of a cyclic amine selected from the group consisting of pyridine, quinoline, nicotine, and piperidine and their homologues.

12. The method which comprises heat-reacting glycol with maleic anhydride in an inert atmosphere until the acid value of the condensation product is about one-half that calculated for the original unreacted mixture, adding from 0.004 to 0.06 mol pyridine per mol maleic anhydride to said condensation product and heating the resultant mixture to effect a decarboxylation of unesterified carboxyl groups present in said condensation product with the resultant formation of a soluble, fusible, polymerizable resin.

13. A polymerizable resinous product obtained by heating a mixture of ingredients comprising a mono-ester of an alcohol and an alpha-unsaturated polycarboxylic acid and from 0.004 to 0.06 mol per mol polycarboxylic acid of an amine selected from the group consisting of pyridine, quinoline, nicotine, piperidine, and their homologues to effect decarboxylation of the free carboxyl groups of said mono-ester.

14. A resinous product obtained by decarboxylating free carboxyl groups in a mono-ester of diethylene glycol and an alpha-unsaturated polycarboxylic acid by heating said mono-ester with from 0.3 to 5 per cent by weight of pyridine based on the weight of the polycarboxylic acid.

15. A resinous product obtained by decarboxylating free carboxyl groups in a di-ethylene glycol mono-ester of maleic acid by heating said mono-ester with from 0.004 to 0.06 mol pyridine per mol maleic acid.

MAYNARD C. AGENS.

---

CERTIFICATE OF CORRECTION.

Patent No. 2,373,527.          April 10, 1945.

MAYNARD C. AGENS.

It is hereby certified that error appears in the printed specification of the above numbered patent requiring correction as follows: Page 2, second column, line 74, Example 4, after "benzoic" insert --acids--; page 3, first column, line 55, Example 5, for "either" read --ether--; and second column, line 58, claim 3, strike out "per" first occurrence; page 4, second column, line 32, claim 13, after "effect" insert --a--; and that the said Letters Patent should be read with this correction therein that the same may conform to the record of the case in the Patent Office.

Signed and sealed this 19th day of June, A. D. 1945.

Leslie Frazer (Seal)                                   Acting Commissioner of Patents.